United States Patent [19]

Oliason

[11] Patent Number: 4,743,056

[45] Date of Patent: May 10, 1988

[54] LIFTING TONGS

[76] Inventor: Marc C. Oliason, 8959 Palmetto Ave., Fontana, Calif. 92335

[21] Appl. No.: 72,437

[22] Filed: Jul. 13, 1987

[51] Int. Cl.[4] .............................................. B25J 15/00

[52] U.S. Cl. ................................ 294/116; 294/110.1; 294/104

[58] Field of Search .................. 294/116, 110.1, 110.2, 294/104, 101, 102.2, 115, 90, 118, 100; 24/232 R

[56] References Cited

U.S. PATENT DOCUMENTS

| | | | |
|---|---|---|---|
| 1,457,104 | 5/1923 | Connor et al. | 294/116 |
| 3,011,821 | 12/1961 | Doty | 294/116 |
| 3,029,100 | 4/1962 | Laine | 294/116 |

OTHER PUBLICATIONS

Publication-Crescent Tongs-published by Crescent Tongs, Inc.

*Primary Examiner*—James B. Marbert

*Attorney, Agent, or Firm*—Charles H. Thomas

[57] ABSTRACT

Improved lifting tongs are provided which are particularly suitable for use in lifting heavy sections of cylindrical pipe. The lifting tongs are comprised of first and second opposing jaws and first and second mounting plates which are respectively rigidly joined to the first and second jaws. The mounting plates are arranged in mutually overlapping parallel disposition in spaced separation from each other. First and Second crank or cam levers are interposed in the gap between the mounting plates, and are rotatably secured relative thereto. The crank levers have cam lobes which act against corresponding cam surfaces on the jaws to force the jaws together with about a 4 to 1 mechanical advantage when the tongs are lifted.

11 Claims, 1 Drawing Sheet

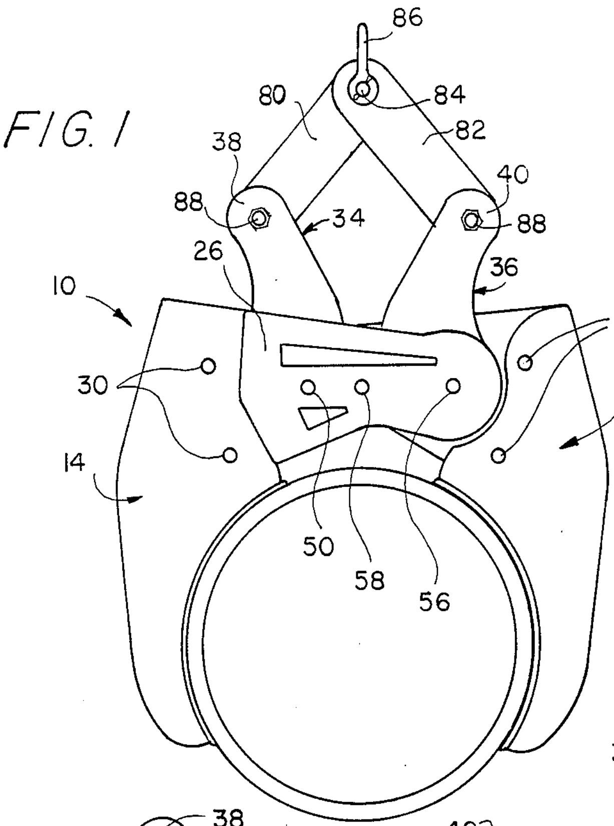
F/G. 1
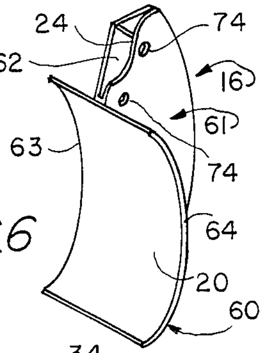
F/G.6
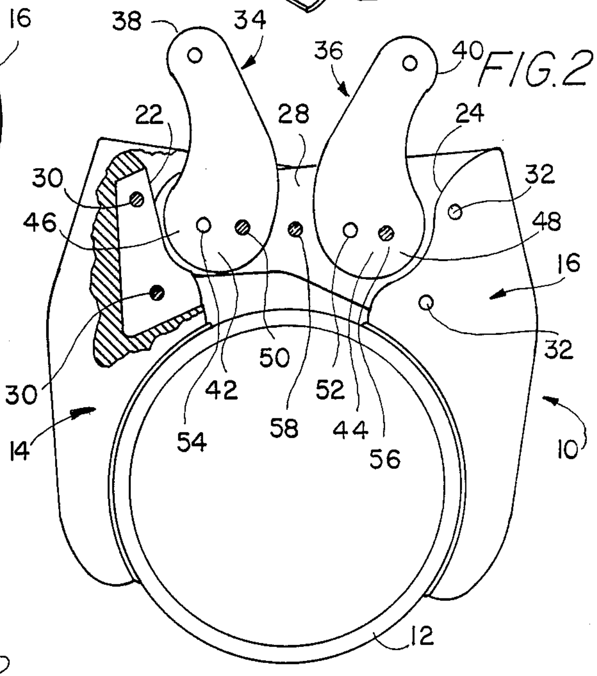
F/G.2
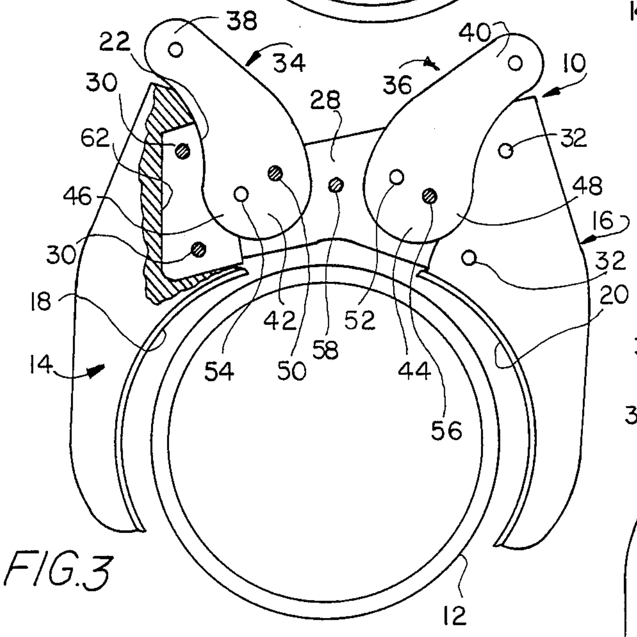
F/G.3
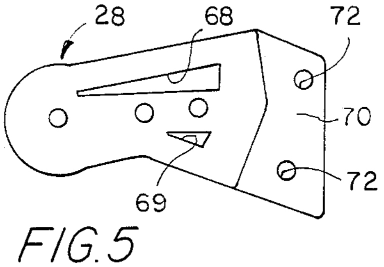
F/G.5
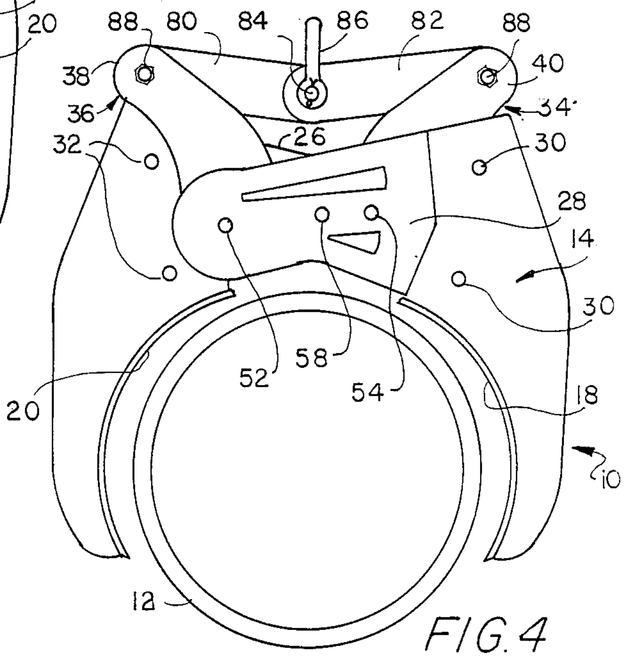
F/G.4

LIFTING TONGS

BACKGROUND OF THE INVENTION

1. Field of the Invention

The present invention relates to lifting tongs for use in lifting heavy sections of cylindrical pipe.

2. Description of the Prior Art

In laying pipelines for use as water lines, sewer lines, oil lines and for other purposes the pipelines are assembled from sections of hollow, tubular, cylindrical lengths of pipe. Each section of pipe may weigh as much as several thousand pounds. Consequently, the sections can be lifted only with an extremely heavy duty crane. Also, the lifting cable of the crane must be provided with some means for gripping the cylindrical sections of pipe. While pipe sections may be lifted by means of encircling loops of cable which encompass the pipe sections, more typically the pipe sections are lifted and laid in place using some form of tongs. Some types of pipe tongs employed for this purpose are manufactured by Crescent Tongs, Inc., located at 1840 Coronado Ave., Long Beach, Calif. 90804 and sold under the trade designation Crescent Pipe Tongs.

Certain limitations exist in the types of pipe tongs which are currently available. Specifically, conventional pipe tongs are manufactured with jaws having gripping surfaces which are particularly suitable for use in cradling pipe sections having outer diameters falling within a rather limited range. Different pipe tongs are required to lift pipe sections of different diameters. For example, commercially available pipe tongs which are designed to lift pipe four inches in outside diameter cannot lift pipe having an outer diameter of fifteen inches. Moreover, conventional pipe tongs are dangerous to use for lifting pipe of a diameter which may vary only slightly from the optimum diameter for which the tongs are designed. When pipe tongs are utilized to lift pipe sections having a diameter greater than the diameter for which the tongs are designed, the tongs are likely to grip the circumference of the pipe over an insufficient arc. Consequently, the pipe can fall from the tongs, thus creating a serious risk of injury and damage. On the other hand, when pipe tongs are utilized to lift pipe of a diameter smaller than the diameter for which they are designed, the pipe is grasped too loosely, and can slide lengthwise relative to the tongs. When this occurs, the pipe will drop and likewise create a very serious risk of injury or damage.

A further limitation of conventional pipe tongs is that the gripping force with which the tong jaws grasp the wall of the pipe may be insufficient to adequately grip extremely heavy pipe, even though that pipe is of a diameter which the tongs are designed to lift. A heavy pipe section can thereby slip from the grasp of the jaws and drop.

SUMMARY OF THE INVENTION

The invention of the present application may be considered to be lifting tongs or pipe tongs designed to lift cylindrical sections of pipe and which solve the problems of the prior, commercially available tongs hereinbefore set forth. Specifically, one object of the present invention is to provide tongs for lifting heavy, cylindrical pipe sections in which movement of the concave gripping surfaces of the tong jaws is accomplished with a high degree of mechanical advantage relative to movement of the jaw actuating mechanisms. According to the invention the pipe gripping surfaces of the tong jaws are moved in response to counter-rotation of a pair of cam or crank levers, which have cam lobes that operate against cam surfaces on the tong jaws. Linear movement of at least three inches at the free extremity of each of the cam levers is transmitted as a movement of no more than one inch of each tong jaw. Since the extent of movement of the tong jaw is substantially reduced from that of the free extremity of the cam lever, the force with which the jaws grip the pipe is multiplied in an inverse fashion. Preferably, the relationship between the movement of the grip actuating mechanism and the jaws of the tongs is such that a mechanical advantage in moving the tong jaws of about 4 to 1 is provided.

Another object of the present invention is to provide pipe lifting tongs which may be utilized in lifting pipe sections that have a wide range of diameters. The pipe tongs of the invention are provided with different sets of interchangeable jaws or arms which may be releasably and interchangably connected to the grip actuating mechanism. Consequently, the same grip actuating mechanism may be utilized with several different pairs of jaws. In the preferred embodiment of the invention one set of jaws is provided to accommodate pipe sections having outer diameters of between about four inches and twelve inches. Another pair of jaws may be alternatively employed with the same actuating mechanism to accommodate pipe sections having outer diameters of between about four and one half inches and about fifteen inches. A third pair of pipe jaws may be alternatively employed to lift pipe sections having an outer diameter of between about twelve inches and about twenty inches.

In one broad aspect the present invention may be defined as lifting tongs for grasping cylindrical sections of pipe. The lifting tongs are comprised of first and second opposing jaws each having an interiorally directed concave gripping surface and an interiorally directed curved cam surface above the gripping surface. The lifting tongs are also comprised of first and second mounting plates rigidly joined to the first and second jaws, respectively. The mounting plates are arranged in mutually overlapping parallel disposition in spaced separation from each other. The lifting tongs are also comprised of first and second crank or cam levers, each having an upper end adapted for attachment to a lifting means and a lower end forming a cam. The lifting tongs are further comprised of fulcrum pins which couple the lower ends of the first and second crank levers to the first and second mounting plates, respectively, in rotatable, eccentric fashion with the cams of the first and second cranks respectively residing in rolling contact with the cam surfaces of the first and second jaws. Actuating connectors are located parallel to and outwardly from the fulcrum connectors and inwardly from the cam surfaces. The actuating connectors rotatably connect to the first crank lever to the second mounting plate and the second crank lever to the first mounting plate. A mounting plate coupling axle is located between the crank levers and parallel to the fulcrum connectors to rotatably join the mounting plates together with the crank levers captured therebetween.

Preferably the lifting tongs of the invention are provided with a plurality of pairs of the first and second jaws. Each of the plurality of pairs of jaws has concave gripping surfaces formed by circular arcs of different radii. The plurality of pairs of jaws are releasably and interchangeably connected to the mounting plates.

The preferred embodiment of the invention also has a pair of extension links rotatably joined together. One of each of the extension links is rotatably hinged to a separate one of the upper ends of the crank levers. The crank levers and the extension links form a scissors linkage. Movement of he scissors linkage produces a mechanical advantage in moving the concave gripping surfaces of the jaws of about 4 to 1.

The invention may be described with greater clarity and particularity by reference to the accompanying drawings.

DESCRIPTION OF THE DRAWING

FIG. 1 is a side elevational view illustrating a preferred embodiment of tongs according to the invention while lifting a cylindrical section of pipe.

FIG. 2 is a side elevational view of a portion of the tongs of FIG. 1, partially broken away and with one of the mounting plates thereof removed for clarity of illustration.

FIG. 3 is an elevational view of the tongs of FIG. 2 with the tong jaws shown in a released condition.

FIG. 4 is an elevational view from the opposite side of the tongs of FIG. 1 showing the jaws in a released condition.

FIG. 5 is a side elevational view of one of the mounting plates of the tongs of the invention shown in isolation.

FIG. 6 is a perspective view of one of the jaws of the tongs of FIG. 1 shown in isolation.

DESCRIPTION OF THE EMBODIMENT

FIG. 1 illustrates a set of tongs 10 especially adapted for lifting cylindrical sections of pipe, such as the pipe section indicated in an end view at 12. The tongs 10 are formed with first and second opposing arms or jaws, indicated respectively, at 14 and 16, first and second mounting plates 26 and 28, cam levers 34 and 36, fulcrum connecting pins 50 and 52, actuating connectors 54 and 56, and a central mounting plate coupling axle 58.

The jaws 14 and 16 define lower, mutually facing, interiorally directed arcuate gripping surfaces 18 and 20, respectively. Above the surfaces 18 and 20 the jaws 14 and 16 respectively define interiorally directed curved cam bearing surfaces which are indicated at 22 and 24 and which are best depicted in FIG. 2. The inwardly facing cam surfaces 22 and 24 are located above the lower pipe gripping surfaces 18 and 20.

Interiorally from the jaws 14 and 16 the tongs 10 include a first mounting plate 26, visible in FIG. 2 and a second mounting plate 28, visible in FIGS. 2–5. The mounting plates 26 and 28 are rigidly joined to the first and second jaws or arms 14 and 16, respectively. The mounting plate 26 extends laterally from the jaw 14 and is rigidly secured thereto by means of releasable jaw fastening pins 30. The mounting plate 26 extends laterally from the jaw 14 and toward the jaw 16 from adjacent the cam surface 22 of the jaw 14. The mounting plate 28 is rigidly secured to the jaw 16 by means of releasable jaw fastening pins 32, and extends toward the jaw 14 from the jaw 16 adjacent the cam surface 14 on the jaw 16. The mounting plates 26 and 28 are arranged in mutually overlapping, parallel disposition and in spaced separation from each other so a to define a gap therebetween. The gap occupies the space between the mounting plates 26 and 28 and is bounded at opposite ends by the curved cam bearig surfaces 22 and 24 of the opposing arms or jaws 14 and 16.

The tongs 10 are also comprised of first and second cam levers or crank levers 34 and 36, respectively. The cam levers 34 and 36 function as actuating levers. Each cam lever has free ends 38 and 40, respectively, protruding upwardly from between the mounting plates 26 and 28. The free ends 38 and 40 of the cam levers 34 and 36 are adapted for connection to some form of lifting means. The first and second cam levers 34 and 36 also have lower ends 42 and 44 which define cam lobes 46 and 48, as best depicted in FIGS. 2 and 3. The lower ends 42 and 44 of the cam levers 34 and 36 are disposed in the gap between the mounting plates 26 and 28.

A first fulcrum connecting pin 50 rotatably joins the cam lever 34 to the first mounting plate 26, while a second fulcrum connecting pin 52 rotatably joins the second cam lever 36 to the second mounting plate 28. The first fulcrum connecting pin 50 serves as a first fulcrum axle which rotatably couples the lower end 42 of the cam lever 34 to the mounting plate 26 in rotatable, eccentric fashion such that the cam lobe 46 of the first cam lever 34 resides in rolling contact with the cam surface 22 of the first jaw 14. Similarly, the fulcrum connecting pin 52 serves as a second fulcrum axle which joins the lower end 44 of the second cam lever 36 to the second mounting plate 28 in rotatable, eccentric fashion with the cam lobe 48 of the second cam lever 36 residing in rolling contact with the cam surface 24 of the second jaw 16. As best illustrated in FIGS. 2 and 3, the cam levers 34 and 36 move in counter-rotation relative to each other, whereby the cam lobe 46 of the first cam lever 34 moves in eccentric rotation against the cam surface 22, and the cam lobe 48 of the second cam lever 36 likewise moves in eccentric rotation against the cam surface 24 of the jaw 16.

A first actuating connector 54 is disposed between the first fulcrum connector 50 and the cam bearing surface 22 of the first jaw 14 and rotatably joins the first actuating cam lever 34 to the second mounting plate 28. Similarly, a second actuating connector 56 is disposed between the second fulcrum connector 52 and the cam bearing surface 24 of the second jaw 16 and rotatably joins the second actuating cam lever 36 to the first mounting plate 26. The actuating connectors 54 and 56 are located parallel to and outwardly from the fulcrum connectors 50 and 52 and inwardly from the cam surfaces 22 and 24.

A central plate coupling connector 58 is located between the first and second cam levers 34 and 36 and rotatably couples the mounting plates 26 and 28 together. The central plate coupling connector 58 serves as a mounting plate coupling axle and is located between the crank levers 34 and 36 and is parallel to the fulcrum connectors 50 and 52. The plate coupling connector 58 spans the gap between the mounting plates 26 and 28 and passes between the cam levers 34 and 36 to rotatably join the mounting plates 26 and 28 together with the cam levers 34 and 36 captured therebetween.

The jaws 14 and 16 are relatively narrow at their lower extremities and are wider at their upper extremities. The jaws 14 and 16 are identical in construction. The jaw 16 is illustrated in isolation and in perspective in FIG. 6. As illustrated in FIG. 6 the lower, arcuate concave gripping surface 20 is formed from a solid, rectangular metal plate which is bent in a circular arc at a radius corresponding to the onside radius of the pipe section 12. The width of the arcuately curved plate 60 is sufficient to provide longitudinal stability to the pipe section 12. The plate 60 may, for example, have a width of approximately four inches between the edges 63 and 64 thereof. The arcuately curved rectangular plate 60 may be constructed of steel having a thickness of one-quarter of one inch. The jaw 16 also includes a vertically oriented configured slab 61 which may, for example, be constructed of steel one inch in thickness. The lower portion of the steel slab 61 is solid, but a pocket or cavity 62 is defined in the upper portion of the slab 61. A pocket 62 is defined in both of the jaws 14 and 16. Each pocket 62 is bounded at one edge by the cam surface 22 or 24 of the jaw 14 or 16 in which the pocket 62 is defined. The pocket 62 is defined with generally parallel upper and lower edges and is roughly trapezoidal in overall configuration.

Mounting plates 26 and 28 are likewise identical to each other in structure. The mounting plate 28 is illustrated in isolation in FIG. 5. Each mounting plate 26 and 28 is constructed of a generally flat slab of metal which may, for example, be a slab of steel. A first end of each of the mounting plates 26 and 28 is rounded in a generally semicircular configuration. The rounded end of each mounting plate 26 and 28 may, for example, be constructed of steel approximately three-quarters of an inch in thickness. Each mounting plate 26 and 28 is uniform in thickness along its length, with the exception of intermediate triangular depressions 68 and 69, which are defined in the outer surface of each of the mounting plates 26 and 28 in order to avoid unnecessary weight, and with the exception of a terminal end flange 70. Each terminal end flange 70 is shaped to fit snugly into a pocket 62 in a jaw 14 or 16. A slight clearance is provided so that the flange 70 can be inserted into and removed from a pocket 62 without undue difficulty. The flange 70 may, for example, be five-sixteenths of an inch in thickness and the pocket 62 is of only slightly greater width.

Each flange 70 is drilled with apertures 72 which align with corresponding apertures 74 that are drilled entirely through the partitions of the slab 61 between which the pockets 62 are defined. The aligned apertures 72 and 74 receive the releasable jaw fastening pins 30 and 32. The jaw fastening pins 30 and 32 are each formed as cylindrical pins with radial, annular channels defined in the surfaces of both ends thereof. The radial channels are adapted to receive resilient C-Shaped clamping rings to prevent the pins from shifting longitudinally. The releasable jaw fastening pins 30 and 32 pass entirely through the structure of the jaws 14 and 16, respectively, and through the mounting plate flanges 70 which are located in the jaw pockets 62. The jaw fastening pins 30 releasably and rigidly secure the first mounting plate 26 to the first jaw 14. The jaw fastening pins 32 releasably and rigidly secure the second mounting plate 28 to the second jaw 16. When the clamping rings are engaged in the channels on both ends of the jaw fastening pins 30 and 32, the mounting plate 26 is immobilized relative to the jaw 14, while the mounting plate 28 is immobilized relative to the jaw 16.

The first and second cam lever 34 and 36 are also identical in construction and are merely turned in opposite directions to face each other in a mirror configuration, as depicted in FIGS. 2 and 3. The cam levers 34 and 36 are of uniform thickness throughout and are disposed in coplanar relationship with each other, within the gap between the mounting plates 26 and 28. This gap is bounded at opposite ends by the cam surfaces 22 and 24. The cam levers 34 and 36, may, for example, by formed of plates of steel five-sixteenths of an inch in thickness. The upper free ends 38 and 40 of the cam levers are relatively narrow, and the lower ends 42 and 44 broaden to form the cam lobes 46 and 48. A pair of extension links 80 and 82 are rotatably joined together by a bail shaft 84. The bail shaft 84 is a cylindrical steel rod which passes through eyes formed at both ends of a shackle like bail 86. The rod 84 is longitudinally immobilized at both ends by cotter pins. Each of the extension links 80 and 82 is rotatably hinged to a separate one of the upper ends 38 and 40 of the cam levers 34 and 36 by a hinge fastener 88. Each hinge fastener 88 is formed of a bolt and mating hexagonal nut. The hinge fasteners 88 connect the extension links 80 and 82 to the cam levers 34 and 36, respectively, so that the cam levers 34 and 36 and the extension links 80 and 82 form a scissors linkage.

Movement of the scissors linkage between the positions depicted in FIGS. 1 and 4 produces a mechanical advantage in moving the concave gripping surfaces 18 and 20 of the jaws 14 and 16 of about 4 to 1. That is, the linear distance of movement of the hinged fasteners 88 between the positions of FIGS. 1 and 4 is four times as great as the distance of linear movement of the gripping surfaces 18 and 20 against the wall of the pipe section 12. Accordingly, the gripping force with which the arcuate surfaces 18 and 20 clamp the pipe section 12 is multiplied in an inverse fashion.

To achieve the requisite mechanical advantage of about 4 to 1, the fulcrum axles 50 and 52 and the actuating connectors 54 and 56 are spaced from each other and from the mounting plate connector 58 in prescribed relative positions. Specifically, when the jaws 14 and 16 are in the fully released position of FIG. 3 with the outwardly directed surfaces of the lobes 46 and 48 of the cam levers 34 and 36 residing in full contact with the cam surfaces 22 and 24, as illustrated, the actuating connectors 54 and 56 may be spaced a total distance from each other of seven and five-sixteenths inches, center to center. The center of the fulcrum axle 50 is spaced from the center of the actuating connector 54 a distance of one and one-half inches. The angle formed from the center of the fulcrum axle 50 to the center of the connecting actuator 54 to the center of the connecting actuator 56 is twenty five degrees when the jaws 14 and 16 are in the fully released positions of FIGS. 3 and 4. Likewise, the center of the fulcrum axle 52 is located a distance one and one-half inches from the center of the actuating connector 56, and the angle formed between the fulcrum connector 58, the actuating connector 56 and the actuating connector 54 is likewise twenty five degrees. In this position the fulcrum axles 50 and 52 are in horizontal alignment with each other and the actuating connectors 54 and 56 are in horizontal alignment with each other. The center of the mounting plate connector 58 is midway between the fulcrum axles and the actuating connectors, as measured both vertically and horizontally. The centers of the hinge fasteners 88 are located a distance of seven and one-quarter inches from the centers of the fulcrum axles 50 and 52.

When the pipe 12 is to be lifted the tongs 10 are first lowered by means of a crane hook onto the pipe section 12. The bail 86 has a loop which is adapted to receive the crane hook. When the tongs are lowered onto the pipe section 12, the jaws 14 and 16 are fully opened and the cam levers 34 and 36 are counter rotated such that the distance of separation of the upper ends 38 and 40 thereof is at a maximum. In this position the outward counter rotation of the upper ends 38 and 40 pushes the arcuate gripping surfaces 18 and 20 of the jaws 14 and 16 apart.

When the pipe section 12 is to be raised, the crane hook lifts vertically upwardly on the bail 86. This movement collapses the scissors linkage formed by the cam levers 34 and 36 and the extension links 80 and 82 from the position of FIG. 4 to the position of FIG. 1. The cam levers 34 and 36 move together in mutual counter-rotation with the upper ends 38 and 40 thereof being drawn toward each other, thereby drawing the actuate gripping surfaces 18 and 20 of the jaws 14 and 16 together with a mechanical advantage of about 4 to 1. Each of the cam levers 34 and 35 rotates in an arc of about twenty five degrees, as measured at the midpoint between the fulcrum axles and the actuating connectors. That is, the hinge fastener 88 of the cam lever 36 moves in an arc of twenty five degrees measured in a radius centered at the mid point along a line joining the fulcrum axle 52 and the actuating connector 56.

When the jaws 14 and 16 have been drawn together into the fully clamped positions depicted in FIGS. 1 and 2, the fulcrum axles 50 and 52, the actuating connectors 54 and 56, and the plate connector 58 all reside in the same horizontal plane. In moving from the fully released position of FIGS. 3 and 4 to the fully clamped positions of FIGS. 1 and 2 the mounting plates 26 and 28 rotate relative to each other about the mounting plate connector 58 through an arc of six degrees, two minutes.

A very important feature of the invention is the interchangability of different jaws. Preferably, a plurality of pairs of the first and second opposing jaws 14 and 16 are provided, wherein the concave gripping surfaces of each of the pairs of jaws 14 and 16 have different configuations of curvature. To interchangably replace one pair of jaws with another pair of jaws with a different configuration, the clamping rings on the releasable fasteners 30 and 32 are removed, thereby allowing the fastening pins 30 and 32 to be withdrawn. The jaws 14 and 16 of one jaw pair can then be removed from the flanges 70 of the mounting plates 26 and 28. The jaws of an interchangeable pair of jaws may then be connected to the flanges 70 of the mounting plates 26 and 28. That is, a jaw 14 is pressed against the mounting flange 70 of the mounting plate 26 until the flange 70 thereof seats in the jaw cavity 62. The releasable fastening pins 30 are then inserted through the aligned apertures 72 and 74 and the clamping rings thereof are fastened. Likewise, a jaw 16 is pushed onto the mounting plate 28 so that the flange 70 thereof seats in the cavity 62 defined therewithin. The releasable fasteners 32 are then reinserted into the aligned apertures 72 and 74 in the jaw 16 and the flange 70 of the mounting plate 28, and the clamping rings are again reinstalled.

By utilizing different jaws, the tongs 10 may be utilized to lift sections of pipe having widely varying diameters. Also, the considerable mechanical advantage provided by the tong linkage described allows each set of jaws to be used with a greater range of diameters of the pipe sections 12 than is currently possible with conventional pipe lifting tongs.

Undoubtedly, various changes and modifications may be made to the embodiment of the tongs of the invention described. For example, in the preferred embodiment the jaws and the mounting plates are constructed as separable elements. However, it is possible to achieve the mechanical leverage of the invention where the first jaw and mounting plate are formed as a unitary structure. Also, the mounting plates and jaws need not be constructed with mounting plate flanges insertable into pockets in the jaws, although such a construction is preferred. Accordingly, the scope of the invention should not be construed as limited to the particular embodiment of the invention depicted and described herein, but rather is defined in the claims appended hereto.

We claim:

1. Lifting tongs for grasping cylindrical sections of pipe comprising first and second opposing jaws each having an interiorally directed concave gripping surface and an interiorally directed curved cam surface above said gripping surface, first and second mounting plates rigidly joined to said first and second jaws, respectively, and arranged in mutually overlapping, parallel disposition in spaced separation from each other, first and second crank levers each having an upper end adapted for attachment to a lifting means and a lower end forming a cam, fulcrum pins coupling said lower ends of said first and second crank levers to said first and second mounting plates, respectively, in rotatable, eccentric fashion with said cams of said first and second crank levers respectively residing in rolling contact with said cam surface of said first and second jaws, actuating connectors located parallel to and outwardly from said fulcrum connectors and inwardly from said cam surfaces and rotatably connecting said first crank lever to said second mounting plate and said second crank lever to said first mounting plate, and a mounting plate coupling axle located between said crank levers and parallel to said fulcrum connectors to rotatably join said mounting plates together with said crank levers captured therebetween.

2. Lifting tongs according to claim 1 further comprising a plurality of pairs of said first and second jaws wherein each pair of jaws has concave gripping surfaces formed by circular arcs of different radii, and said plurality of pairs of jaws are releasably and interchangeably connectable to said mounting plates.

3. Lifting tongs according to claim 1 further comprising a pair of extension links rotatably joined together and one end of each of said extension links is rotatably hinged to a separate one of said upper ends of said crank levers, whereby said crank levers and said extension links form a scissors linkage, and movement of said scissors linkage produces a mechanical advantage in moving said concave gripping surfaces of said jaws of about 4 to 1.

4. Lifting tongs according to claim 1 wherein each of said jaws is formed with a jaw pocket bounded at one edge by the cam surface thereof, and each of said mounting plates has a flange thereon which fits into one of the aforesaid jaw pockets, and further comprising releasable jaw fasteners which pass through the structure of said jaws, and through said mounting plate flanges in said jaw pockets to releasably rigidly secure said first mounting plate to said first jaw and said second mounting plate to said second jaw.

5. Tongs for lifting cylindrical sections of pipe comprising: first and second opposing arms each defining a concave, arcuate gripping surface and each defining a curved bearing surface at its upper extremity, first and second mounting plates rigidly joined to said first and second arms, respectively, laterally offset from said bearing surfaces and extending toward each other in overlapping fashion to define a gap therebetween which is bounded at opposite ends by said bearing surfaces of said opposing arms, first and second actuating levers each having a free end for attachment to a lifting device and an actuating end defining a cam lobe and disposed in said gap between said mounting plates, a first fulcrum connector rotatably joining said actuating end of said first actuating lever to said first mounting plate, and a first actuating connector disposed between said first fulcrum connector and said bearing surface of said first arm and rotatably joining said actuating end of said first actuating lever to said second mounting plate, a second fulcrum connector rotatably joining said actuating end of said second actuating lever to said second mounting plate, and a second actuating connector disposed between said second fulcrum connector and said bearing surface of said second arm and rotatably joining said actuaing end of said second actuating lever to said first mounting plate, and a central plate coupling connector located between said first and second actuating levers and rotatably coupling said mounting plates together, whereby said actuaing levers move together in mutual counter-rotation to alternatively push said arcuate gripping surfaces of said arms apart and draw said arcuate gripping surfaces of said arms together.

6. Tongs according to claim 5 further comprising a plurality of pairs of said first and second opposing arms, wherein the gripping surfaces of each of said pairs of arms are of different configurations of curvature and further comprising releasable fasteners for interchangeably securing said first arm of each pair of arms to said first mounting plate and said second arm of each pair of arms to said second mounting plate.

7. Tongs according to claim 6 wherein an arm cavity of uniform size is defined in each of said arms adjacent the curved bearing surface thereof, and each of said mounting plates includes a fastening flange adapted to fit into said arm cavities, and said fasteners releasably secure the fastening flange of each mounting plate of a selected one of said pairs in the cavities of said opposing arms.

8. Tongs according to claim 5 wherein said fulcrum connectors, said actuating connectors and said central plate coupling connector are located to produce a mechanical advantage of about 4 to 1 in movement of said opposing arms responsive to counter-rotating movement of said actuating levers.

9. Lifting tongs for lifting cylindrical sections of pipe comprising: a pair of jaws having lower, mutually facing arcuate concave surfaces and upper inwardly facing cam surfaces, a pair of mounting plates, one extending laterally from each of said jaws adjacent the cam surface thereon, whereby said mounting plates reside in mutually parallel, overlapping disposition and define a gap therebetween and said cam surfaces define end boundaries of said gap, a pair of cam levers disposed side by side within said gap between said mounting plates, each cam lever having a free end protruding upwardly from between said mounting plates and adapted for connection to a lifting means, and a lower end defining an outwardly directed cam lobe, a first fulcrum axle rotatably coupling the lower end of one of said cam levers to one of said mounting plates, whereby said cam lobe of said one of said cam levers moves in eccentric rotation against the cam surface of one of said jaws, a second fulcrum axle rotatably coupling the lower end of the other of said cam levers to the other of said mounting plates, whereby said cam lobe of said other of said cam levers moves in eccentric rotation against the cam surface of the other of said jaws, a first actuating connector rotatably coupling said lower end of said one of said cam levers to said other of said mounting plates between said first fulcrum axle and said cam surface of said one of said jaws, a second actuating connector rotatably coupling said lower end of said other of said cam levers to said one of said mounting plates between said second fulcrum axle and said cam surface of said other of said jaws, and a mounting plate connector which spans said gap betwen said cam levers and rotatably joins said mounting plates together.

10. Lifting tongs according to claim 9 wherein said fulcrum axles and said actuating connectors are spaced from each other and from said mounting plate connector to produce a mechanical advantage of about 4 to 1 in movement of said jaws responsive to movements of said free ends of said cam levers.

11. Lifting tongs according to claim 9 further comprising a plurality of interchangeable pairs of jaws as aforesaid, and fastening means for releasably securing a selected pair of jaws to said mounting plates.

* * * * *